Sept. 12, 1967  E. M. BRACALENTE ET AL  3,340,727
ABLATION PROBE
Filed March 30, 1962  2 Sheets-Sheet 1
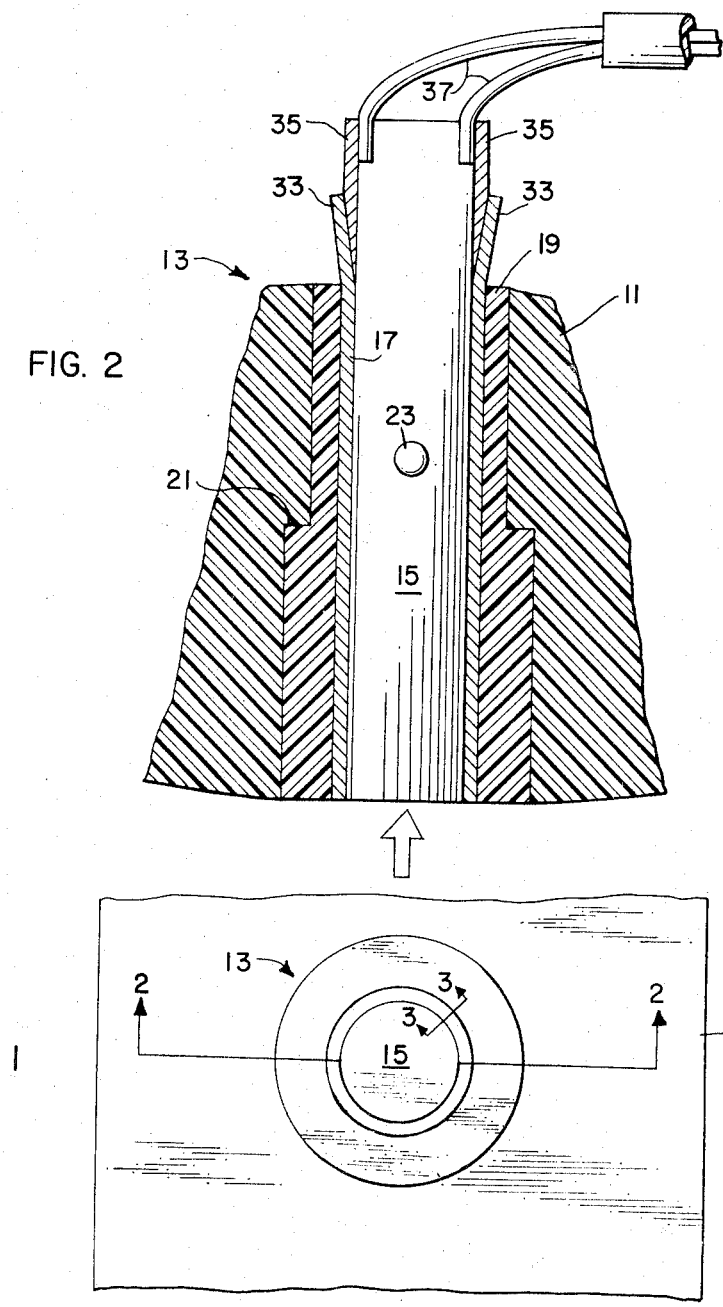
INVENTORS
EMEDIO M. BRACALENTE
FERDINAND C. WOOLSON
BY
ATTORNEYS Sept. 12, 1967  E. M. BRACALENTE ET AL  3,340,727
ABLATION PROBE Filed March 30, 1962  2 Sheets-Sheet 2

INVENTORS
EMEDIO M. BRACALENTE
FERDINAND C. WOOLSON

BY

J.M. Carson, Jr.
ATTORNEYS

United States Patent Office 3,340,727
Patented Sept. 12, 1967

3,340,727
ABLATION PROBE
Emedio M. Bracalente, Denbigh, and Ferdinand C. Woolson, Hampton, Va., assignors to the United States of America as represented by the Administrator of the National Aeronautics and Space Administration
Filed Mar. 30, 1962, Ser. No. 183,982
6 Claims. (Cl. 73—86)

The invention described herein may be manufactured and used by or for the Government of the United States of America for governmental purposes without the payment of any royalties thereon or therefor.

This invention relates generally to erosion test probes and more specifically to variable capacitance erosion measurement elements.

In recent years much research has been devoted to solving the problems of reentry vehicle heating occurring when a space vehicle reenters the atmosphere of the earth upon return from an orbital or probe mission. Such space vehicles as are known or presently contemplated travel at a high velocity while approaching the upper layers of the atmosphere, and the frictional heating experienced shortly after reentry may be in the order of several thousand degrees Farenheit, or greater than the melting point of conventional vehicle surface metals. Of the several solutions to this heating problem heretofore suggested, one of the more promising is covering the leading portions of such a vehicle with a readily ablative material, so that the ablation taking place during reentry will serve to dissipate most of the frictional heat generated.

Ablation, or the wearing away of material subjected to a high velocity air flow, occurs at various rates and under varying conditions in different materials. While some materials are transformed from solid to liquid to gaseous state, others change directly from a solid to a gas; but in either case, a large amount of heat is absorbed during such transformation, and can be carried away from the vehicle surface by the flow of air therearound. It has been found that at some velocities and with certain materials, more than 90% of the frictionally generated heat can be dissipated by the use of the ablation process.

Of course, the development of a new technique such as ablative cooling of a vehicle surface creates a need for new concepts and systems for measurement of the rate and amount of occurrence of such action under varying conditions. Thus it has become necessary to find means for measuring ablation rates and amounts within acceptable degrees of accuracy. Several devices are presently known for measuring material erosion, or mechanical wearing away of matter, and similar devices have been suggested heretofore for sensing corrosion parameters during chemical wearing away of matter. A sensing probe of some type is often utilized in such devices, and most commonly this probe comprises a wire exposed to the eroding or corroding medium and connected into an electrical circuit so as to vary the total resistance thereof as the wire is worn away. This principle is utilized in what is commonly called the "break-wire" technique, in which a plurality of such wires are mounted so as to be sequentially exposed to the eroding medium and thereby to afford a sequential indication of the rate of or amount of erosion.

The hereinbefore mentioned sensing techniques, which may be called collectively resistance probe methods, have certain inherent disadvantages which render them undesirable for sensing ablation effects, however. Among these disadvantages is the fact that the high, rapidly changing temperatures involved, with consequent significant resistance value variations, render resistance probes inaccurate and difficult to calibrate. Further, insofar as the "break-wire" probes are concerned, any measurement is of necessity discontinuous, and it becomes necessary to mount the wires thereof in close proximity to one another, in the order of one-hundredth of an inch apart, so as to even approximate continuous sensing. Additionally, with certain ablative materials, such as Teflon or nylon, the temperature of ablation is so low and rate of ablation so high relative to those of the wires normally used that these resistance wires fail to erode rapidly enough, and are therefore left exposed in areas where the ablative material has already ablated, thus giving erroneous indication signals and adversely effecting the ablation of the remainder of the ablative material.

The foregoing and other shortcomings of resistance type probes, insofar as sensing the ablation of readily ablative materials is concerned, have caused a need to arise for a probe capable of continuously and accurately sensing the rate and amount of ablation occurring in an ablative material subjected to a high velocity air flow. Such a probe must satisfy certain design and performance criteria not provided by presently available test probes. Primarily, the probe must be free of significant error when subjected to extremely high, rapidly varying temperatures. Also, the probe must be sufficiently small and rugged to be mounted in a relatively confined area within a shield of ablative material, which is normally of small volume. Further, it is of the utmost importance that the probe be so constructed that its presence in the ablative shield will cause, at most, only negligible variation in the ablation rate exhibited by the shield without the probe. Additionally, it is desirable that such a probe be capable of utilization in either test specimen shields for wind tunnel and other experiments, or in actual flight models. Consideration of the foregoing and other criteria coupled with extensive research and testing have produced the present invention, which is considered to afford for the first time an erosion or ablation probe possessing the necessary qualities to fulfill the hereinbefore mentioned and other requirements.

Accordingly, it is an object of this invention to provide a new and improved probe for sensing the rate and amount of erosion of matter.

A further object of the present invention is the provision of a new and improved erosion sensing probe of rugged and compact construction.

Another object of the instant invention is the provision of an ablation probe adapted to be mounted in an ablative material without significantly varying the ablation rate of such material.

An additional object of this invention is to provide a new and improved ablation probe which is capable of functioning reliably and accurately in the presence of high and rapidly varying temperatures.

Still another object of the present invention is the provision of a capacitance-type ablation probe.

Yet another object of this invention is the provision of an ablation probe adapted to sense the ablation of such highly ablative materials as Teflon or nylon.

According to the present invention, the foregoing and other objects are attained by providing a capacitance-type ablation probe adapted to be mounted within a body of ablative material and comprising a condenser rod, an inner condenser plate wrapped around the condenser rod, an outer condenser plate, a dielectric material between the inner and outer plates, and a sensor body carried by the condenser rod through the condenser plates, each of the condenser rod, the dielectric material and the sensor body being of a material having ablation characteristics substantially the same as the ablative material in which the probe is mounted.

A more complete appreciation of the invention will be gained and many of the attendant advantages thereof will be readily apparent as the same becomes better understood by reference to the following detailed description when considered in connection with accompanying drawings wherein:

FIG. 1 is a front elevational view of a probe according to the present invention mounted in a heat shield;

FIG. 2 is a sectional view along lines 2—2 of FIG. 1;

Figure 3:
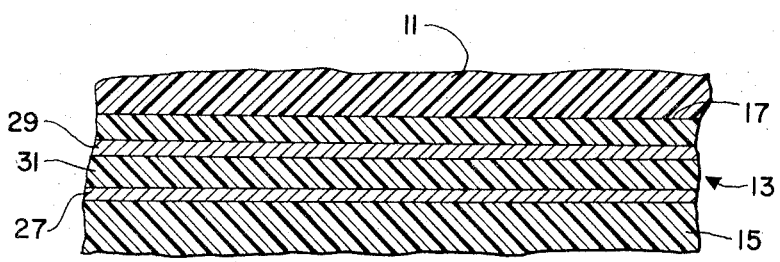
FIG. 3 is a sectional view along lines 3—3 of FIG. 1.

Referring now more particularly to the drawings, wherein like reference numerals designate identical parts throughout the several views, and more particularly to FIG. 1, there is shown by way of illustration a portion of a heat shield 11 of ablative material which may be attached to the leading edges or surfaces of a reentry vehicle, not shown. During use, high velocity air flow will strike the heat shield in the direction generally indicated by the arrow in FIG. 2. Heat shield 11 may be formed of various materials having readily ablative qualities, such as various graphite compositions, plastics, and the like. One of the materials well suited for such purposes is polytetrafluoroethylene, produced by E. I. DuPont de Nemours, Inc., of Wilmington, Delaware, and sold under the trademark of "Teflon." When subjected to frictional heating by a high velocity air stream, Teflon is transformed directly from a solid to a gaseous state, and thus exhibits excellent properties as an ablative material for use in a heat shield.

For various reasons, it is often desirable to measure both the rate of ablation and the total amount of ablation occurring in a heat shield such as that shown in FIG. 1. Primarily, these measurements are of interest in testing activities for evaluating various materials under varying conditions, and in actual flight missions to determine whether reentry is being accomplished at a safe rate. The present invention provides a novel, accurate means for this measurement.

Mounted within the heat shield is an ablation probe, generally indicated by reference numeral 13. As best shown in FIG. 2, the ablation probe comprises condenser rod 15 which may be generally cylindrical in form. Wrapped around the forward portion of rod 15 is a condenser sheet 17, to be more fully described hereinafter. The forward edge of sheet 17 is coterminous with the forward end of rod 15, so as to be fully supported thereby. Mounted on rod 15 through sheet 17 is annular sensor head 19, of generally cylindrical shape, and preferably provided with a shoulder 21 for addition of rigidity in its mounting in shield 11. By force-fitting the rod and sheet assembly within sensor head 19 a relatively rigid construction may be afforded. The head and protruding rod may then be force-fitted or threaded securely into the heat shield, thus providing a rugged and compact unitary assembly. A pin 23 may serve to securely assemble the ablation probe 13, or other suitable means may be utilized for this purpose.

Figures 1A, 4:
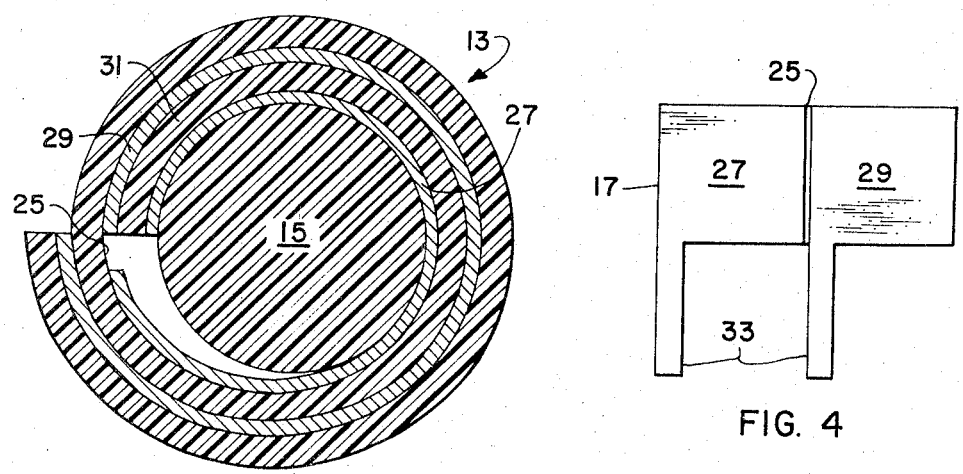
FIG. 1a is a front elevational view of the probe in enlarged detail.
FIG. 4 is a plan view of a condenser sheet used in the probe.

Referring now more particularly to FIGS. 1a, 3 and 4, the condenser sheet will be more particularly described.

Condenser sheet 17 is formed by applying to a sheet of ablative material, such as that shown in FIG. 4, a uniform thin coating of a conductive material. A particularly suitable material for this purpose is aluminum, which may be readily deposited in a thin film and which has excellent conductive properties and a low melting temperature, thus interfering only negligibly with ablation of the shield. Numerous methods exist for providing a thin, uniform coating, such as vapor deposition or the like. Approximately midway along sheet 17 a narrow gap 25 is provided in which there is no conductive material. This region may be provided, for example, by initially depositing conductive material over the entire surface and then etching the material away along the desired line. Sheet 17 is then wrapped around condenser rod 15 in the manner shown in FIG. 1a, with the conductive material adjacent the rod during the first wrap.

Accordingly, there is provided an inner plate 27 and an outer plate 29 of conductive material, these plates being separated by a dielectric 31 of the ablative material and by gap 25 in the conductive material. Terminal portions 33 of condenser sheet 17 extend rearwardly along rod 15 (as shown in FIG. 2), and these terminals may be connected through suitable intermediate conductors 35 to cable 37 and thus into suitable utilization circuity 39.

Hence, referring to FIG. 3, it will be seen that there is provided a pair of condenser plates 27, 29, extending through a significant portion of heat shield 11 and separated by a suitable dielectric.

In order to enable the condenser to ablate at a rate closely similar, if not identical, to that of the heat shield, it is preferable that material of rod 15 and sheet 17 be the same as that forming the heat shield, or have closely similar ablation characteristics.

With ablation probe 13 thus assembled and mounted in heat shield 11, condenser sheet 17, comprising plates 27, 29, may be utilized in any one of several types of utilization circuitry. For example, the condenser may serve as one arm of a conventional Wheatstone Bridge, the output of which can be measured and otherwise used in known manner. As ablation progresses along the shield and sensor the size of plates 27, 29 will decrease and, accordingly, their capacitance will be varied, thus modifying bridge output and providing an intelligence signal in readily useable form. The use of capacitance measurement to determine ablation rate and amount has the desirable effect of providing a sensing element less susceptible to erroneous readings due to rapid temperature variations than conventional resistance probe devices. As almost all of probe 13 is composed of material having the same or closely similar ablative characteristics, there is but little variation in the ablation of the heat shield caused by the introduction of a measuring device. The aluminum plates melt at sufficiently low temperature and are of sufficiently low mass to cause no problem in this respect. It has been found that accurate, yet rugged, probes may be constructed according to the present invention with overall diameters of one inch or less. The output signal from this device may be most commonly used simply to provide an indication of ablation rate or amount; however, in actual flight conditions, this signal may be used to control reentry velocity, since, for example, were reentry progressing at too rapid a rate with consequent overly rapid ablation, the consequent signal from probe 13 could serve to retard reentry velocity as by controlling the force produced by retro-rockets.

Figure 5:
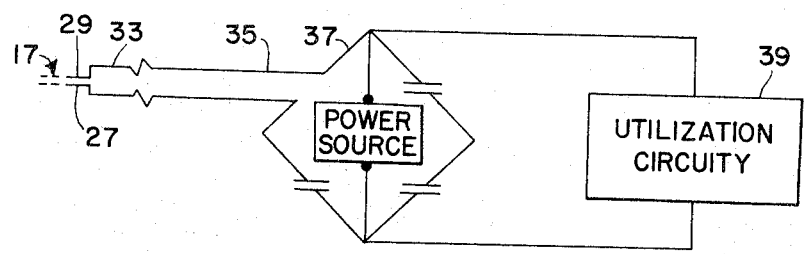
FIG. 5 is a schematic representation of a circuit in which the invention may be incorporated.

It is to be understood that while Teflon or nylon may be preferable as the material for forming the heat shield, the condenser rod, the condenser sheet and sensor head, other materials may be used for this purpose. The connections between the various terminals, conductors, and cables may be made by any suitable means such as soldering. The measurement circuit shown in FIG. 5 is merely for purposes of example and may be readily modified by one skilled in the art.

Obviously many modifications and variations of the present invention are possible in the light of the above teachings, and it is therefore to be understood that within the scope of the appended claims, the invention may be practiced otherwise than as specifically described.

What is claimed as new and desired to be secured by Letters Patent of the United States is:

1. An ablation sensing probe adapted to be mounted in a body of ablative material, comprising:
   a rod of ablative material;

a sheet of ablative material wrapped around said rod at least twice in such a manner that an end thereof is coterminous with one end of said rod;

a thin film of conductive material mounted on one face of said sheet so as to cover all of said face of said sheet except for one continuous portion thereof disposed axially along said rod and defining two areas of conductive material;

a generally tubular sensor head, formed of ablative material, surrounding said sheet and rod and carried thereby;

means securing said rod, sheet, and head in assembled relationship; and electrical leads connecting said areas of conductive material to a utilization circuit.

2. An ablation probe adapted to be mounted in a body of ablative material, comprising:

a support;

a condenser sheet including an ablative dielectric and a pair of thin film conductive plates coated on said dielectric; said sheet being wrapped around said support so that said plates are in overlapping relationship to one another; and electrical leads conecting said plates to a utilization circuit.

3. The probe according to claim 2, wherein said ablative dielectric is polytetrafluoroethylene.

4. The probe according to claim 2, wherein said plates are aluminum.

5. In a system for measuring the erosion of the surface of a body, the combination comprising: an erosion sensor consisting of at least one film of material having electrical properties formed to provide an electrical impedance element having a length at least equal to the depth of erosion of said body to be measured, spaced apart electric current-carrying wires electrically connected to said impedance element at one end thereof, said impedance element being secured to a form composed of the same material as said body, said wires extending at one end of said form, the other end of said impedance element being flush with the other end of said form; means securing said erosion sensor in said body with said other end of said impedance element flush with said surface of said body, whereby said surface and said other end of said impedance element erode simultaneously; a source of electrical energy connected to said impedance element through said wires; and means for measuring the change in impedance of said element due to erosion whereby an instantaneous indication of the depth of erosion is provided.

6. In a system for measuring the erosion of the surface of a body, the combination comprising: an erosion sensor consisting of first and second films of conducting material fixedly spaced apart on forms composed of the same material as said body to provide a capacitive impedance element, said films and forms having a length at least equal to the depth of erosion of said body to be measured, and an electric current-carrying wire connected to each of said first and second films at one end thereof, the other end of said films being flush with one end of said forms; means securing said forms in said body with said other end of said films being flush with said surface of said body, whereby said surface and said other end of said impedance element erode simultaneously; a source of electrical energy connected to said impedance element through said wires; and means for measuring the change in capacitance in said impedance element due to erosion whereby an instantaneous indication of the depth of erosion is provided.

References Cited

UNITED STATES PATENTS

| 2,533,716 | 12/1950 | Coursey | 317—260 |
| 2,783,420 | 2/1957 | Thompson et al. | 317—246 |
| 2,866,141 | 12/1958 | Frank et al. | 317—246 |
| 2,919,390 | 12/1959 | Robinson et al. | 317—260 |
| 3,015,950 | 1/1962 | Doctor et al. | 324—71.3 X |

DAVID SCHONBERG, *Primary Examiner.*

RICHARD QUEISSER, *Examiner.*